United States Patent [19]

Grimme

[11] Patent Number: 4,768,315
[45] Date of Patent: Sep. 6, 1988

[54] SHADING AND HEAT INSULATING DEVICE

[75] Inventor: Friedrich W. Grimme, Aachen, Fed. Rep. of Germany

[73] Assignee: Kernforschungsanlage Juelich GmbH, Juelich, Fed. Rep. of Germany

[21] Appl. No.: 72,223

[22] Filed: Jul. 10, 1987

[30] Foreign Application Priority Data

Jul. 16, 1986 [DE] Fed. Rep. of Germany ....... 3623960

[51] Int. Cl.⁴ .............................................. E04B 1/34
[52] U.S. Cl. ......................................... 52/2; 52/171; 126/426
[58] Field of Search ....................... 52/2, 171; 126/426

[56] References Cited

U.S. PATENT DOCUMENTS

| | | | |
|---|---|---|---|
| 2,830,606 | 4/1958 | Daugherty | 52/2 |
| 2,854,014 | 9/1958 | Hasselguist | 52/2 |
| 3,611,648 | 10/1971 | Barnett | 52/2 |
| 4,108,373 | 8/1978 | Chiapale | 47/17 |
| 4,173,212 | 11/1979 | Whitcomb | 47/17 |
| 4,301,626 | 11/1981 | Davis | 47/17 |
| 4,305,235 | 12/1981 | Roston | 52/2 |
| 4,446,850 | 5/1984 | Zilisch | 47/17 |
| 4,470,405 | 9/1984 | Landstrom | 47/17 |

FOREIGN PATENT DOCUMENTS 2454074 12/1980 France ................................ 47/17
2,485,589 12/1981 France ................................ 47/17

OTHER PUBLICATIONS

Norrkoepings Tidningar, Norrkoeping, Sweden, May 18, 1982, "Norrkoeping Greenhouse Brings Floral Riches to the Arctic Circle".

Primary Examiner—Henry E. Raduazo
Attorney, Agent, or Firm—W. G. Fasse; D. H. Kane, Jr.

[57] ABSTRACT

A shading and heating insulating device, especially for greenhouses, has two films of flexible plastic material interconnected to form a type of pouch enclosing a hollow space, which is preferably divided into a plurality of tunnels. A supply pipe is operatively quick-coupled to one end of a distribution conduit, the jacket of which is operatively connected to one edge of the hollow space for feeding a pourable heat insulating material into the hollow space. A return pipe may be operatively quick-coupled to a collection conduit, the jacket of which is operatively connected to an opposite edge of the hollow space for withdrawing the pourable insulating material out of the hollow space and returning it to a storage container. When the hollow space is empty, the pouch may be rolled up, for example by rotating one of the conduits, or the pouch may be folded after release of at least one quick-coupling member.

14 Claims, 5 Drawing Sheets

SHADING AND HEAT INSULATING DEVICE

FIELD OF THE INVENTION

The invention relates to a shading and heat insulating device, for example for greenhouses. The term "shading" in this context means controlling the extent of light exposure of plants in a greenhouse, for example.

DESCRIPTION OF THE PRIOR ART

Shading and heat insulation devices of the type mentioned above include a hollow space enclosed by two walls, for example made of plastic film. One end of the hollow space that may be referred to as a pouch-type enclosure is connected to a supply pipe for a pourable heat insulating material and the opposite end of the pouch is connected to a return pipe. The supply pipe and the return pipe are connected to a storage container for holding a pourable heat insulating material, such as small polystyrene particles or the like. Pump means are provided and driven for transporting the pourable heat insulating particles through the pipe means into the hollow space of the pouch and for returning the heat insulating particles out of the pouch back into the storage container.

A device of the above type has been described in an article that appeared in "Norrkoepings Tidningar" on May 18, 1982 in Norrkoeping, Sweden. The article was entitled "Norrkoeping Greenhouse brings floral riches to arctic circle". The device is used for forming greenhouse roofs and/or walls. The device is formed of two layers of plastic films, which extend over defined fields of the greenhouse support frame structure. The edges of the films are so connected to the elements of the support frame structure, that hollow spaces or pouches are formed over the entire surface area of the fields formed by frame members. These hollow spaces or pouches are filled as required by polystyrene particles in pellet form, which are normally stored in the storage container and which are transferred into the hollow spaces through a pump system which also permits the return of these pellets into the storage container.

The known device permits achieving a relatively good shading and also an excellent heat insulation of a greenhouse. However, at certain times, neither a shading nor a heat insulation of the greenhouse is required. Rather, at such times the unimpeded entrance of daylight and especially sunlight is desirable. Even if at certain times the pourable material, such as polystyrene particles are completely removed from the hollow spaces between the two films, these films nevertheless cause a substantial reduction in the light entering the greenhouse. And this light reducing or shading effect is even reinforced due to the use of two films in parallel to each other. As a result, and having in mind the substantial influence of the light entrance on the growth of the plants, greenhouses of a glass enclosure type are preferred now as before, because standard plastic flexible films that are presently available, do not reach the translucency of glass under long term conditions, even if these films should have the same durability as glass, which frequently they don't. Additionally, standard flexible films of plastics material are subject to an ageing process which reduces their translucency with the passage of time.

The known device also cannot achieve an optimal heat insulation efficiency in connection with a glass-type greenhouse because the support frame structure forms inherently extensive heat transfer bridges through which large heat losses occur, even though the fields covered by the pouches filled with heat insulating pellets provide an excellent heat insulation.

OBJECTS OF THE INVENTION

In view of the foregoing it is the aim of the invention to achieve the following objects singly or in combination:

to provide a shading and heat insulating device, which is capable of improving the shading and heat insulation of an enclosed space, especially of a greenhouse in such a way, that on the one hand during the day time the losses of solar energy through the enclosing structure and outer skin are minimized to achieve a maximum plant growth;

to achieve simultaneously with the same device an optimal heat insulation especially during the night-time in order to substantially reduce the energy requirements for heating such greenhouses as compared to conventional greenhouses;

to improve the pouch construction in such a way, that the feeding of the pourable particles of heat insulating material into the pouch and the removal of such material from the pouch can take place uniformly and so that heat insulating layers of substantially uniform thickness may be formed throughout the areas to be covered;

to construct a heat insulating and shading device of the type described herein, in such a way that it is usefull for existing greenhouses as well as for new structures, whereby in both instances the formation of heat transfer bridges can be avoided substantially completely without any expensive sealing procedures;

to facilitate the removal of these heat insulating devices either by rolling up or by folding;

to make the present device transportable even when it is filled with heat insulating pellets, so that it may be moved from one surface area to another;

to provide a structure, which permits stretching the heat insulating pouch uniformly in a given plane;

to provide for filling the hollow space or spaces within the pouch with different pourable heat insulating materials at different times, so that materials of different degrees of opaqueness or translucency may be used at different times; and to facilitate the snow removal from the roof of a greenhouse.

SUMMARY OF THE INVENTION

The shading and heat insulating device according to the invention is characterized in that the supply pipe and/or the return pipe for pourable particles of heat insulating material are connected to the end of a distribution conduit and to the end of a collection conduit, whereby at least one of the conduits is moveable relative to the other conduit. The device is formed of at least two walls of a plastic, flexible film. An inlet is provided along one edge of the pouch. An outlet is provided along an opposite edge of the pouch. The inlet is connected to a longitudinal first channel in the jacket of the distribution conduit. An outlet of the pouch is connected to a longitudinal channel formed in the jacket of the collection conduit. The hollow space of the pouch is divided into a plurality of parallel tunnels arranged alongside each other and preferably perpendicularly to the longitudinal axes of the distribution conduit and of the collection conduit.

By providing a quick connect and disconnect coupling at least between the moveable conduit and the respective supply or return pipe, it is possible to also move the double walled film, that is connected to the moveable conduit. Stated differently, if necessary, the pouch made of the doubled-wall film structure can be partially or completely stretched over an outer skin of a greenhouse and it may be as quickly removed, or the pouch itself may form the outer skin of the greenhouse in accordance with particular requirements. Thus, different portions of a greenhouse may be covered or uncovered as required.

By dividing the pouch into a plurality of hollow tunnels perpendicularly to the longitudinal axis of the distribution and collection conduits, the pouch has a substantially improved inherent stiffness and additionally it becomes possible to uniformly fill and empty the hollow spaces, since the flow of the pourable heat insulating material particles through these tunnels is relatively uniform. Yet another advantage is seen in that the layer thickness becomes uniform throughout the surface areas to be covered.

Since the present device is applied to the outer surface of a structure, it is useful in connection with existing greenhouses as well as with new greenhouses. In both instances, any metal frame members of the greenhouse support frame structure are completely covered in an outward direction, so that heat transfer bridges are completely avoided, without any expensive sealing features.

At least one of the distribution and collection conduits is rotatable about its longitudinal axis, so that the double-walled pouch can be rolled onto this conduit, or rolled off this conduit after the pourable heat insulating material particles has been removed from the pouch. Rather than providing for a roll-up feature, it is also possible to make one of the conduits moveable in the plane defined by the longitudinal axis of the two conduits, so that the moveable conduit can be moved in a direction perpendicularly to its longitudinal axis for a folding operation. The folding may take place in zigzag fashion to form a package, which later can be unfolded again.

Where a folding or rolling-up is not required, it is possible to move the entire device in its maximum area covering size from one area of a greenhouse to another. For this purpose, support means or frame members are provided, which keep the conduits at a constant spacing from each other, whereby a frame is formed by the conduits and the support frame members with the foil stretched in such frame. The frame is then movable in a plane from one area of a greenhouse to another.

According to a further modification of the invention, it is possible to construct the present device, so that it is sufficiently strong against normal wind forces. For this purpose, the conduits and the support or frame members are so constructed, that the pouch or rather the film, forming the pouch can be stretched in directions extending substantially perpendicularly to the longitudinal axis of the conduits and perpendicularly to the longitudinal axis of the support frame members. In one embodiment the film or pouch edges are formed as an expandable bead, which is received in a gap or groove of the respective frame member, which preferably encircles the bead by somewhat more than 180° so that the expanded bead is solidly received within the support frame member, such as a tubular member, having a respective cross-section. The tubular member itself may form the support structure or it may be part of the support structure.

In a further embodiment of the invention, the collecting conduit may be shaped to form a rain gutter and the rigidly arranged distribution conduit may be shaped to form a ridge beam or it may be part of a ridge beam of a greenhouse for example. It has been found to be sufficient that the collection conduits shaped as a rain gutter can be held solely by the films forming the pouch, so that the pouch which connects the rain gutter to the ridge beam carries the respective loads. The collecting conduit may, in this instance, be flexibly supported, if desired, or it may be movably supported.

By making the tunnels between the two films substantially pressure-tight, it is possible to expand the tunnels by air pressure, whereby the two films are maintained at a defined spacing from each other. This feature has the important advantage, that the tunnels can be easily filled and emptied again, for example, with particles, such as polystyrene pellets in the shape of tiny spheres forming said pourable heat insulating material. The present device filled with polystyrene spheres can be used as an excellent temporary heat insulation at times when there is not enough solar energy so that heat losses through the outer skin of a greenhouse can be drastically reduced.

The present device is capable of covering large surface areas of a greenhouse, so that any heat transfer bridges are also covered without any additional steps. Further, any leaks in the outer skin of a greenhouse including those intentionally provided for venting purposes can be effectively sealed by the present device during times when such seal is desired. As a result, a maximal heat insulation is achieved, while simultaneously reducing the natural air exchange between the greenhouse and its environment. Such natural air exchange is usually limited by the structural features of the greenhouse.

Yet another advantage of the present device is seen in that it may be used for covering areas of any desired size, so that certain areas may be shaded and other areas that do not require shading may be easily uncovered as desired.

It has further been found, that the present device does not add appreciably to the static load of a greenhouse even if the pouch is filled with polystyrene spheres. This is so, because the bulk weight of the spheres and the weight of the plastic flexible film is relatively small. The filled device has a weight which is noticeably below about 25% of the snow load that needs to be taken into account anyway when calculating the static load that must be taken up by greenhouses. If a snowfall should take place, then the present device is rolled up or folded up so that the roof surfaces can be kept snow free by the conventional heating. It is further possible to fill the pouch with hot air after the pourable heat insulating material has been removed so that melting of the snow is even accelerated without raising the inside temperature of the greenhouse. This feature provides a horticultural simplification because the greenhouse itself, which is covered by the hot air filled pouch, needs to be heated only to the conventional temperature of about 12° C., whereby the hot air used in the pouch for the snow melting does not result in an undesirable higher temperature inside the greenhouse. In greenhouses that are well heat insulated in a conventional manner it has been found, that the internal temperature of the greenhouse must be drastically raised in order to keep the roof surfaces free of snow. As a result, the energy requirements for removing snow from the greenhouse roof are increased. And this temperature increase is a disadvantage for certain plant cultures because the increased temperature inside the greenhouse may result in an acceleration of the growth rate which, if it has to be maintained over prolonged periods of time may result in a culture, or crop, that may have to be sold before its time and hence possibly at reduced prices. The present invention avoids these problems.

Another advantage of the device according to the invention is seen in that in its blown-up state the device is capable of transferring wind and compression forces into the structural frame work of the greenhouse without any damage to the present device. Any suction caused by wind can be counteracted by a rigidly mounted pipe or the like that introduces any wind forces into the structural frame work of the greenhouse. The filling opening leading into the distribution conduit and the discharge opening leading out of the collection conduit may be rigidly locked to the greenhouse frame structure during times in which abnormally high wind forces are to be expected.

The blown-up device which is maintained continuously under pressure but which is not yet filled with the pourable heat insulating material is sufficiently stiff against bending so that damages due to flutter movements are unlikely. Further, when the device is filled with polystyrene spheres, the stiffness of the pouch is even substantially increased.

Another advantage of the invention is seen in that the tunnel construction facilitates the complete removal of the pourable heat insulating material particles even if antistatic means are not employed, because a change in the air pressure can change the spacing between the films and a circulating air flow may be established for the complete removal by means of a higher air speed of the circulating air flow. Thus, the problems encountered in so-called bead-wall windows are avoided according to the invention. Additionally, a relatively flat roof slope also does not have any disadvantageous effects on the present device.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
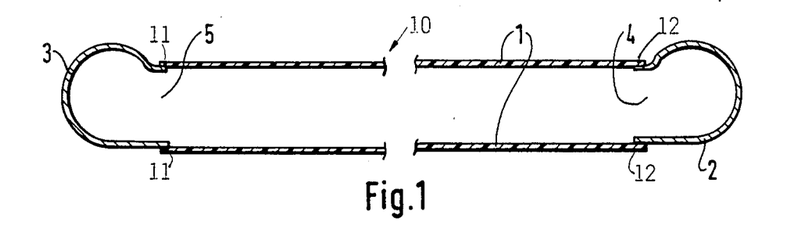
FIG. 1 is a sectional view along section line 1—1 in FIG. 8 showing the present device in its stretched out condition.
Figure 8:
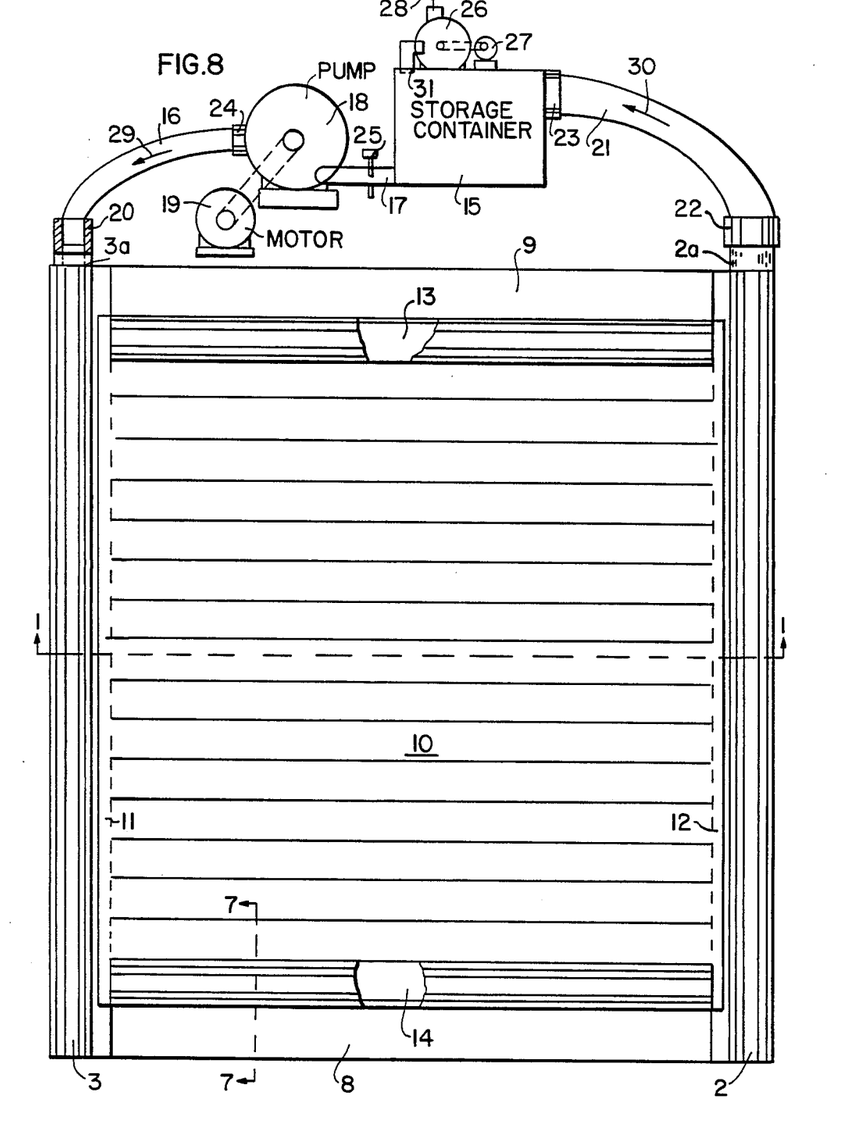
FIG. 8 is a top plan view of the present device.

FIG. 8 shows a top plan view of a shading and heat insulating device according to the invention comprising a pouch 10 made of flexible material such as two sheets of plastic films or walls 1, please see FIG. 1. The two plastic films 1 enclose a hollow space inside the pouch 10. The pouch 10 has an inlet 5 leading into the hollow space along first edges 11 formed by the two walls 1 of the pouch 10. An outlet 4 is formed by second edges 12 of the walls 1 to form an exit out of the hollow space inside the pouch 10. The pouch 10 has further edges including third and fourth edges 13 and 14 extending substantially perpendicularly to the first edges 11 and the second edges 12. A storage container or reservoir 15 holds pourable heat insulating material particles, such as polystyrene pellets or the like which may be either opaque or transparent as will be described in more detail below. A distribution conduit 3 forms a longitudinal first channel which is connected to the inlet 5 of the pouch 10. A collection conduit 2 forms a second longitudinal channel connected to the outlet 4 of the pouch 10. First pipe sections 16 and 17 connect the reservoir 15 to one end 3a of the distribution conduit 3. A pump 18 with its motor 19 is operatively inserted between the pipe sections 16 and 17 for transporting pourable heat insulating material particles out of the reservoir 15 into the pouch 10. A conventional quick-coupling 20 connects one end of the pipe section 16 to the inlet end 3a of the distribution conduit 3. A return pipe section 21 connects the reservoir 15 to an outlet end 2a of the collection conduit 2 whereby again a quick-coupling 22 is preferably provided between the pipe section 21 and the outlet end 2a of the conduit 2. A further quick-coupling 23 may be provided between the pipe section 21 and the reservoir 15.

Figure 2:
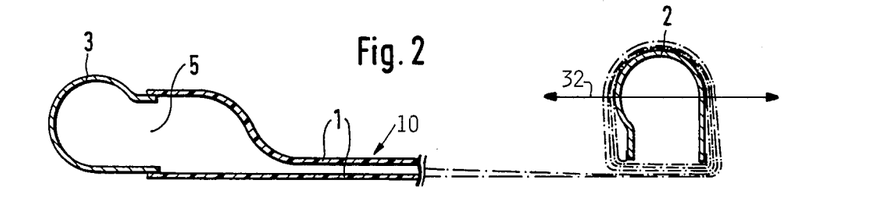
FIG. 2 is a view similar to that of FIG. 1, however illustrating the rolling-up of the present device, whereby a portion of the pouch has already been wound onto one of the conduits.

Due to the quick-coupling members 20 and 22 it is possible to disconnect the pipe section 16 or the pipe section 21 or both pipe sections quickly from the conduits 3 and/or 2 so that the pouch 10 may be rolled up as shown in FIG. 2. Prior to such rolling-up operation, the pourable heat insulating material particles have been removed out of the pouch 10 and into the reservoir 15.

Referring further to FIG. 8, a quick-coupling 24 may also be provided between the pump 18 and the pipe section 16. A manually operable valve, such as a slide gate 25 is preferably inserted in the pipe section 17, if it is desired to use a second pump 26 with its motor 27 for evacuating the pouch 10 as indicated by the arrow 28. Incidentally, the arrow 29 indicates movement of pourable material into the pouch 10, while the arrow 30 indicates movement of pourable material out of the pouch 10. A screen 31 would normally be provided between the suction inlet of the pump 26 and the reservoir for keeping the pellets in the reservoir.

Incidentally, the edges 11 and 12 of the flexible plastic films 1 may be secured to the respective edges of the conduits 3, 2, by an adhesive bonding or a high frequency welding, if the materials of the films 1 are compatible with the material of the conduits 3, 2 for such purpose..Removable mechanical clamping means are also usable.

Figure 3:
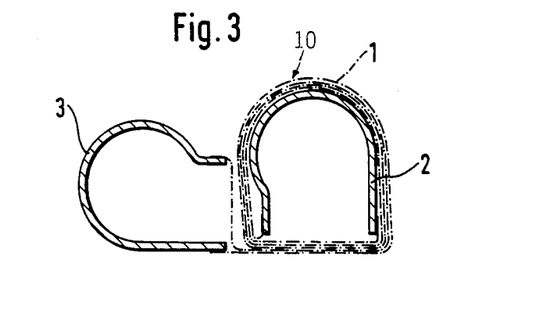
FIG. 3 is a view similar to that of FIGS. 1 and 2 but showing the pouch completely rolled up on one of the conduits.

The arrow 32 in FIG. 2 indicates the direction of movement of the conduit 2 in a plane substantially defined by the longitudinal axes of the conduits 2 and 3. Thus, when the pouch 10 is rolled up, the conduit 2 moves toward the conduit 3 and when the pouch 10 is rolled out again, the conduit 2 moves away from the conduit 3. However, the arrangement may also be vice-versa, so to speak. FIG. 3 shows the completely rolled up state of the pouch 10. Thus, one conduit may be rigidly supported and the other is held only by its connection to the pouch or vice-versa. The reservoir 15 has a size sufficient for holding enough material to fill the pouch 10. The other conduit may be movably supported.

Figures 4, 5:
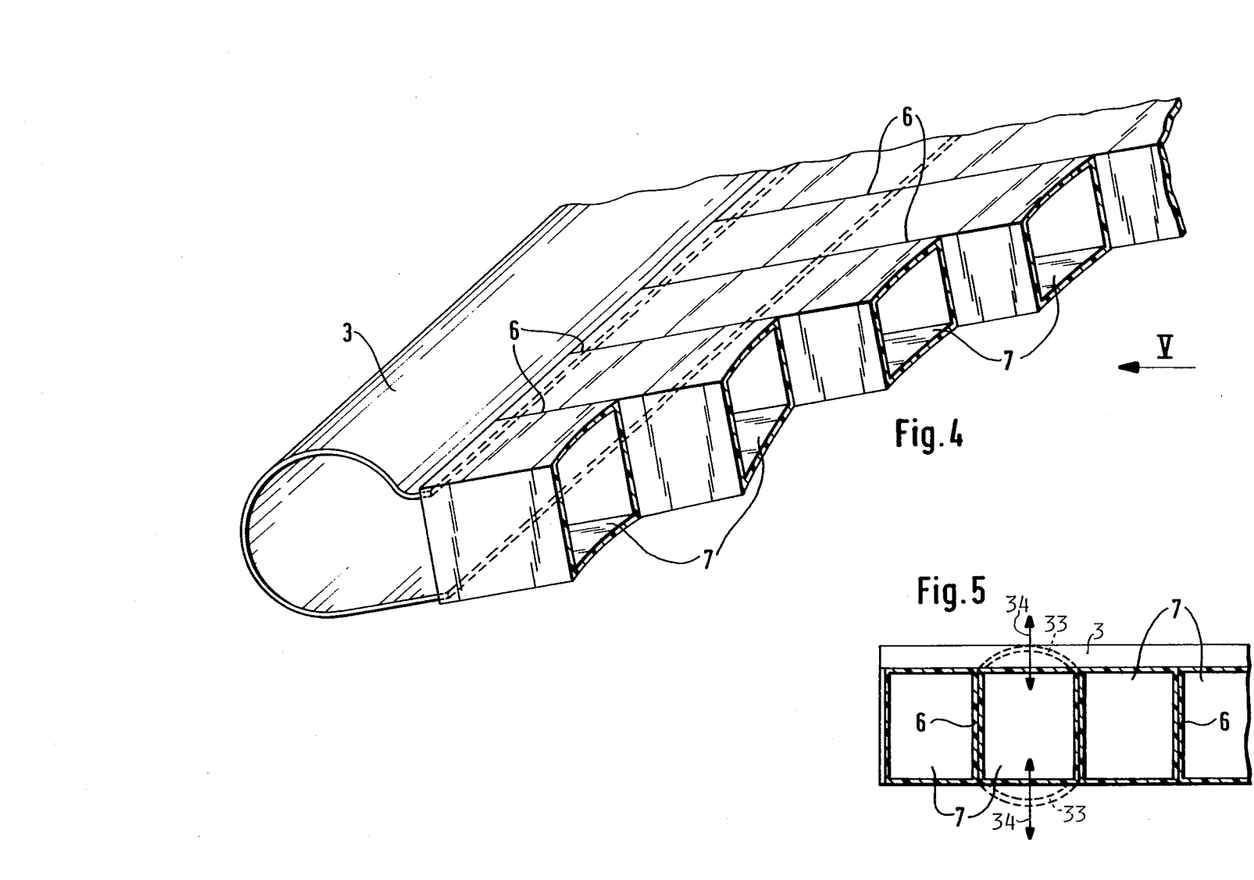
FIG. 4 is a perspective view partially in section illustrating the tunnel construction within the present pouch.
FIG. 5 is a sectional view in the direction of the arrow V in FIG. 4.

FIGS. 4 and 5 show the details of the pouch construction. The pouch 10 is divided into a plurality of tunnels 7 by separation walls 6, whereby two neighboring separation walls 6 may form a double wall as best seen in FIG. 5. As indicated by dashed lines 33 and arrows 34 for one tunnel 7, it is possible to expand all tunnels 7 simultaneously by pressurized air, whereby the entire pouch may have a corrugated type of appearance, when it is filled with air and/or heat insulating material out of the reservoir 15.

Figure 6:
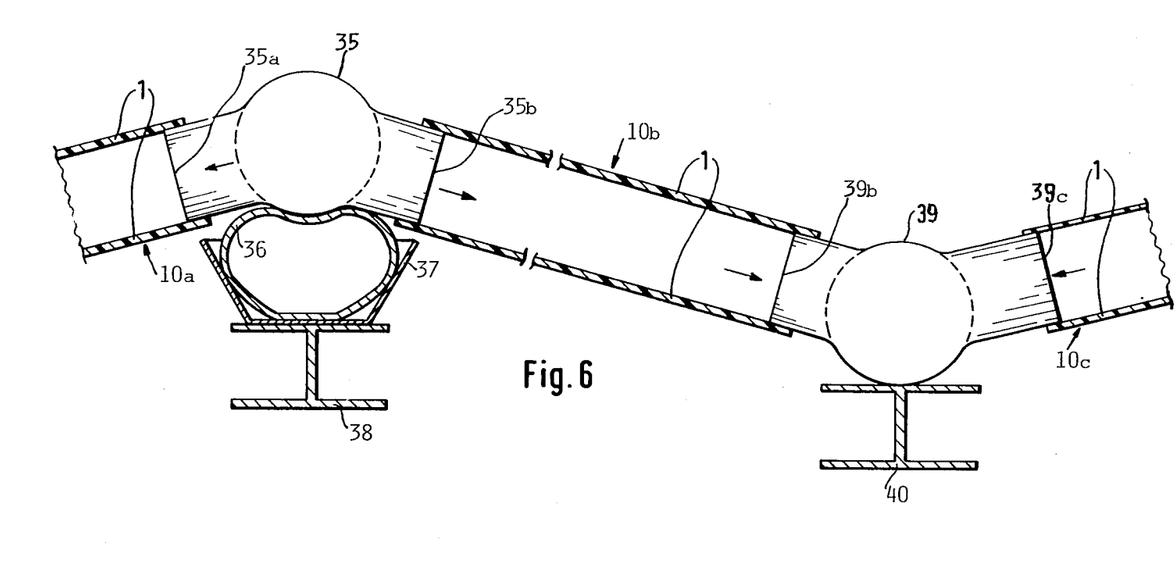
FIG. 6 is a sectional view through a modified embodiment of the invention.

FIG. 6 shows an embodiment in which several pouches 10a, 10b and 10c may cover several greenhouses for example. A distribution conduit 35 rests on a yielding cushion 36 in a trough 37 which in turn is supported on a ridge beam 38 of a greenhouse. A collection conduit 39 rests on a greenhouse wall member 40. Each distribution conduit 35 has two distribution channels 35a and 35b leading into the respective pouches 10a and 10b. Each collection conduit 39, except a collection conduit forming an end conduit, is provided with two collection or exit channels 39b and 39c leading out of the respective pouches 10b and 10c into the collection conduit. In order to provide a wide choice or selectivity in the areas that need to be shaded, it may be desirable to provide releaseable connections between the edges of the films 1 and the respective conduit. Conventional clamping devices may be used for this purpose. Additionally, the conduits 35, 39 may be large and strong enough for a person to walk along the conduits for manually connecting or disconnecting the film edges to the respective conduit.

Figure 7:
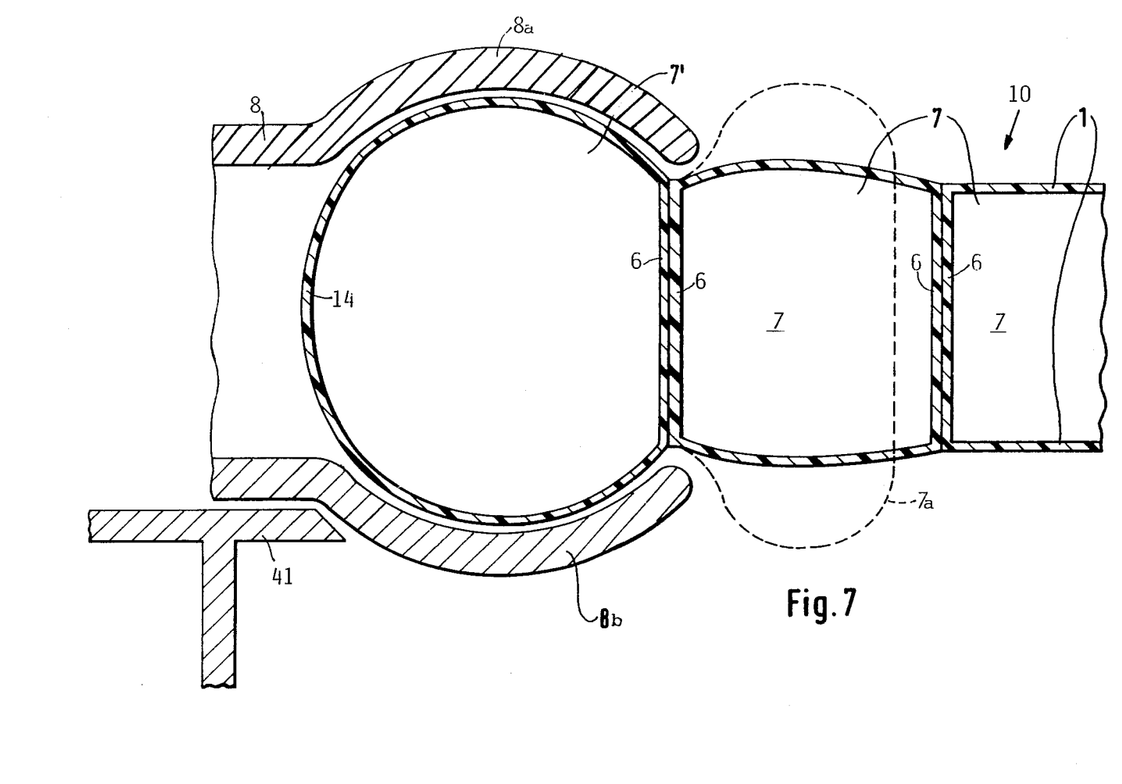
FIG. 7 illustrates a sectional view through a bead-type expandable edge of the present pouch mounted in a support frame member, whereby the section is taken along section line 7—7 in FIG. 8.

It has been found to be desirable sometimes to solidly hold the edges 13 and 14 of a pouch in place. Reference is made in this connection to FIGS. 7 and 8 in combination. The edge 14 is held in place by a support frame member 8. The edge 13 is held in place by a support frame member 9. Only the connection of the edge 14 to the support frame member 8 will be described. The other connection is mirror-symmetrically the same. The support frame member 8 rests for example on a greenhouse frame member 41 and has two fingertype extensions 8a, 8b forming a laterally open longitudinal gap for receiving and releasably holding the respective edge 14 of the pouch 10. The finger-type extensions 8a, 8b encircle the edge 14 for more than 180° so that the edge, when it is expanded, is firmly received in the laterally open gap between the fingers 8a, 8b. The frame members 8 and 9 extend perpendicularly to the distribution and collection conduits and are preferably connected to these conduits by conventional means. The fingers are so shaped and the edges form a pressure expandable bead 7' which is tightly received in the laterally open gap of the support frame members 8 and 9 when the bead 7' is expanded by pressure inside the bead. In this condition the pouch 10 is stretched between the frame members 8 and 9 so that it is firmly held in the entire frame structure formed by the conduits 2, 3 and by the frame members 8 and 9. In the pressurized state the individual channels can also expand as indicated by the dashed line 7a in FIG. 7. The arrangement is such, that in the unpressurized state the limp edge 13, 14 may even be pushed longitudinally inside the respective gap formed between the fingers 8a, 8b. Similarly, in the limp state the pouch edges 13, 14 may be easily laterally withdrawn out of the gap.

As shown in FIG. 6, the top surface of the collection conduit 39 may form part of a rain gutter if desired.

As mentioned, the pourable heat insulating material particles may be opaque or partially opaque and partially translucent for providing any desired shading effect. Pellets of heat insulating material suitable for the present purposes are readily available on the market.

Although the invention has been described with reference to specific example embodiments, it will be appreciated that it is intended to cover all modifications and equivalents within the scope of the appended claims.

What I claim is:

1. A shading and heat insulating device, comprising pouch means made of flexible material forming two walls enclosing a hollow space, said pouch means having an inlet leading into said hollow space along first edges formed by said two walls, an outlet providing an exit out of said hollow space between second edges formed by said two walls, said pouch means further having third and fourth edges, a reservoir for holding pourable particles of heat insulating material, a distribution conduit having a longitudinal first channel connected to said inlet, a collection conduit having a longitudinal second channel connected to said outlet, pipe means for connecting said reservoir to said distribution conduit and to said collection conduit, pump means including motor means for driving said pump means arranged for transporting pourable particles of heat insulating material into said hollow space and for removing pourable particles of heat insulating material from said hollow space to empty said pouch means, quick-coupling means for coupling and uncoupling said pipe means to and from at least one of said distribution and collection conduits to permit rolling up or folding of said pouch means, and support means for normally supporting said distribution conduit and said collection conduit at a constant distance from each other and for defining a plane on which at least one of said conduits is displaceable for rolling-up or unrolling said flexible pouch means when said flexible pouch means are empty by rotating and moving said one conduit relative to the other conduit.

2. The device of claim 1, comprising intermediate wall means forming a plurality of tunnels in said pouch means, said tunnels extending approximately perpendicularly to said distribution conduit and to said collection conduit and communicating with said distribution and collection conduits.

3. The device of claim 1, wherein at least one of said distribution and collection conduits is rotatable about its longitudinal axis for rolling up said pouch onto said rotatable conduit and for unrolling said pouch from said rotatable conduit.

4. The device of claim 1, wherein one of said conduits is rigidly supported while the other of said conduits is displaceable in a direction substantialy perpendicularly to a longitudinal conduit axis and in a plane defined by the longitudinal axes of said conduits.

5. The device of claim 1, wherein said collection conduit forms part of a rain gutter.

6. The device of claim 1, wherein said distribution conduit is rigidly supported to form a ridge beam.

7. The device of claim 1, wherein said distribution conduit is a rigid component forming part of a ridge beam.

8. The device of claim 1, wherein said pourable heat insulating material is opaque for providing a shading.

9. The device of claim 1, wherein said pourable heat insulating material is at least partially translucent for providing a partial shading effect.

10. The device of claim 2, wherein said tunnels have lateral double walls for separating neighboring tunnels from each other.

11. A shading and heat insulating device, comprising pouch means made of flexible material forming two walls enclosing a hollow space, said pouch means having an inlet leading into said hollow space along first edges formed by said two walls, an outlet providing an exit out of said hollow space between second edges formed by said two walls, said pouch means further having third and fourth edges, a reservoir for holding pourable particles of heat insulating material, a distribution conduit having a longitudinal first channel connected to said inlet, a collection conduit having a longitudinal second channel connected to said outlet, pipe means for connecting said reservoir to said distribution conduit and to said collection conduit, pump means including motor means for driving said pump means arranged for transporting pourable particles of heat insulating material into said hollow space and for removing pourable heat insulating material from said hollow space, and quick-coupling means for coupling and uncoupling said pipe means to and from at least one of said distribution and collection conduits to permit rolling up or folding of said pouch means, wherein said third and fourth edges of said pouch means extend substantially perpendicularly to said conduits, said device further comprising hollow sectional frame members, each frame member having a laterally open gap for receiving and releasably holding said third and fourth edges of said pouch means.

12. The device of claim 11, wherein said sectional frame members extend perpendicularly to said distribution and collection conduits, and wherein said third and fourth edges of said pouch means have a shape which can be tightly held by said sectional hollow frame members for stretching said pouch means into a substantially flat shape.

13. The device of claim 12, wherein said shape of said third and fourth edges of said pouch means comprise a pressure expandable bead which is tightly received in said laterally open gap of said frame members when said bead is expanded by pressure inside said bead, said bead being withdrawable from said laterally open gap when pressure is released from said bead.

14. A shading and heat insulating device, comprising a double-walled plastic film enclosing at least a hollow space connected at one end to a supply pipe and at the opposite end to a return pipe, means connecting said pipes to a reservoir for holding particles of pourable heat insulating material which, by means of a conveying unit, can be introduced through said supply pipe into said hollow space, said particles being removable from said hollow space through said return pipe, wherein said supply pipe is connected to the end of a distribution conduit (2) and said return pipe is connected to the end of a collection conduit (3) to which conduits the double-walled plastic film (1) is radially connected, said hollow space of the plastic film being subdivided into a plurality of channels (7) which are arranged in parallel to one another and extend perpendicularly to the longitudinal axis of said conduits (2, 3), said channels being connected with one end to a radial outlet (4) of the distribution conduit (2) and with the other end to a radial inlet (5) of the collection conduit (3), and wherein at least one of said distribution conduit (2) and said collection conduit (3) is movable for rolling-up or unrolling said double-walled plastic film.

* * * * *